US009961827B2

(12) United States Patent
Frogner et al.

(10) Patent No.: US 9,961,827 B2
(45) Date of Patent: May 8, 2018

(54) CONTINUOUS DRY PARTICULATE MATTER INJECTION DEVICE FOR FERTIGATION APPLICATIONS

(71) Applicant: YARA INTERNATIONAL ASA, Oslo (NO)

(72) Inventors: Tore Frogner, Sylling (NO); Håkon Høimyr, Oslo (NO)

(73) Assignee: YARA INTERNATIONAL ASA, Oslo (NO)

( * ) Notice: Subject to any disclaimer, the term of this patent is extended or adjusted under 35 U.S.C. 154(b) by 313 days.

(21) Appl. No.: 14/760,553

(22) PCT Filed: Jan. 10, 2014

(86) PCT No.: PCT/EP2014/050376
§ 371 (c)(1),
(2) Date: Jul. 13, 2015

(87) PCT Pub. No.: WO2014/108501
PCT Pub. Date: Jul. 17, 2014

(65) Prior Publication Data
US 2015/0351317 A1 Dec. 10, 2015

(30) Foreign Application Priority Data

Jan. 14, 2013 (NO) .................................. 20130074

(51) Int. Cl.
*A01C 23/04* (2006.01)
*B01F 3/12* (2006.01)
(Continued)

(52) U.S. Cl.
CPC .......... *A01C 23/042* (2013.01); *B01F 3/1271* (2013.01); *B01F 15/00162* (2013.01);
(Continued)

(58) Field of Classification Search
CPC .............. B01F 15/0261; B01F 15/0235; B01F 15/0229; B01F 15/00279; B01F 15/00162; B01F 2215/0055; A01C 23/042
See application file for complete search history.

(56) References Cited

U.S. PATENT DOCUMENTS

| 3,378,235 A | * | 4/1968 | Udy | .................. B01F 15/00253 366/154.2 |
| 4,191,480 A | * | 3/1980 | Hiorth | ....................... B01F 3/12 138/42 |

(Continued)

FOREIGN PATENT DOCUMENTS

| CN | 2566604 | 8/2003 |
| CN | 101390488 | 3/2009 |

(Continued)

OTHER PUBLICATIONS

Machine Translation of First Office Action dated Oct. 8, 2016 in corresponding Chinese Application No. 201480013668.8.

(Continued)

*Primary Examiner* — Tony G Soohoo
(74) *Attorney, Agent, or Firm* — Wenderoth, Lind & Ponack, L.L.P.

(57) ABSTRACT

A continuous dry particulate matter injection device (1), and more in particular a device for use in a fertigation application in which a soluble matter, such as a fertilizer, is suspended and/or dissolved into the irrigation water in order to use the irrigation system and irrigation water as a delivery system for the soluble matter, in particular a soluble fertilizer. To this end, the device includes at least one feed device (2), suitable for feeding particulate matter, and connected, by a first connection pipe (3), to the top of a vertically positioned slurry mixing chamber (5), located under the first connection pipe (3), and a pressurized mixing tank (12), (Continued)

connected to the bottom of the slurry mixing chamber (5) by a second connection pipe (8). The device is operated in a continuous cycle.

13 Claims, 1 Drawing Sheet

(51) Int. Cl.
*B01F 15/00* (2006.01)
*B01F 15/02* (2006.01)

(52) U.S. Cl.
CPC .... *B01F 15/00279* (2013.01); *B01F 15/0229* (2013.01); *B01F 15/0235* (2013.01); *B01F 15/0261* (2013.01); *B01F 2215/0055* (2013.01)

(56) References Cited

U.S. PATENT DOCUMENTS

| | | | | |
|---|---|---|---|---|
| 5,468,066 | A * | 11/1995 | Hammonds | B01F 1/00 366/139 |
| 6,173,732 | B1 * | 1/2001 | Davis | A01C 23/042 137/268 |
| 7,937,187 | B2 * | 5/2011 | Kaprielian | A01C 23/042 137/78.3 |
| 2002/0186614 | A1 * | 12/2002 | Millward | A01C 23/042 366/167.1 |
| 2004/0042335 | A1 * | 3/2004 | Cecala | A01C 23/042 366/151.1 |
| 2005/0088909 | A1 | 4/2005 | Cecala et al. | |
| 2015/0131406 | A1 * | 5/2015 | Scott | B01F 5/0413 366/151.1 |

FOREIGN PATENT DOCUMENTS

| | | |
|---|---|---|
| CN | 202112028 | 1/2012 |
| CN | 202335234 | 7/2012 |
| EP | 1 749 443 | 2/2007 |
| EP | 2 289 301 | 3/2011 |

OTHER PUBLICATIONS

International Search Report dated Jun. 5, 2014 in International (PCT) Application No. PCT/EP2014/050376.
Search Report dated Aug. 7, 2013 in Norwegian Application No. 20130074.
International Preliminary Report on Patentability dated May 21, 2015 in International (PCT) Application No. PCT/EP2014/050376.

\* cited by examiner

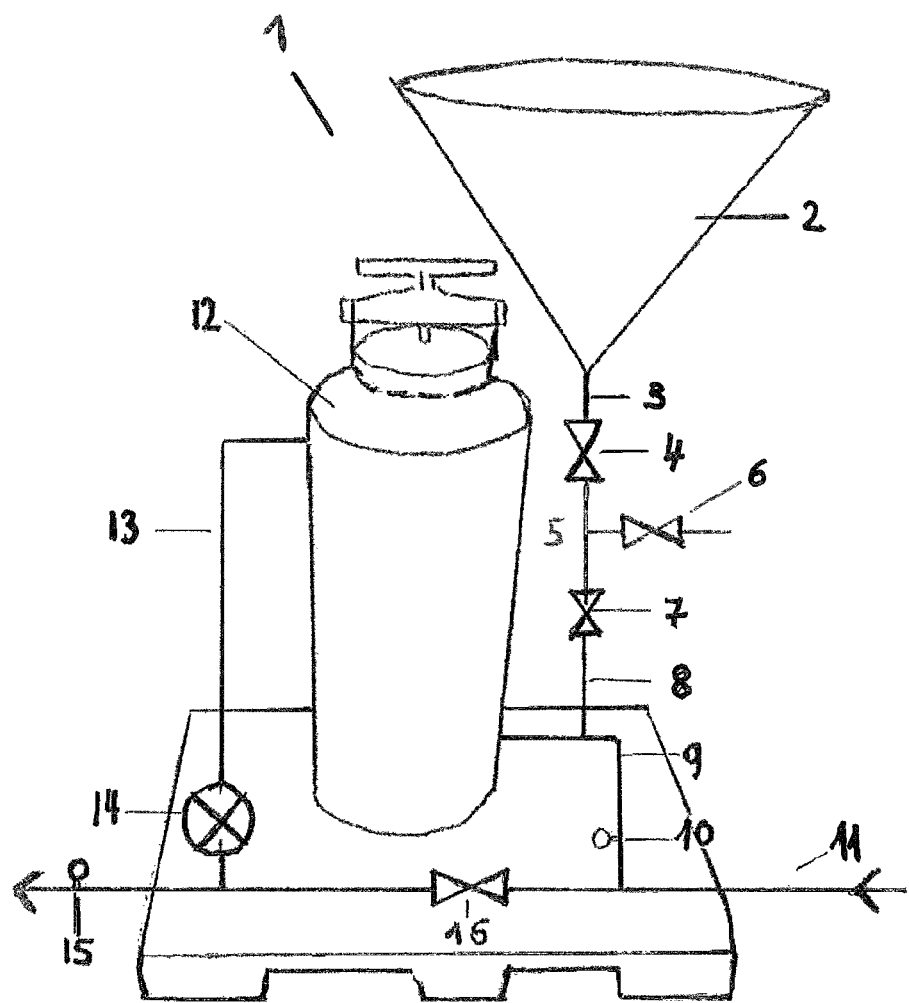

CONTINUOUS DRY PARTICULATE MATTER INJECTION DEVICE FOR FERTIGATION APPLICATIONS

FIELD OF THE INVENTION

The present invention relates to continuous dry particulate matter injection device, and more in particular to a device for use in a fertigation application in which a soluble matter, such as a fertilizer, is suspended and/or dissolved into the irrigation water in order to use the irrigation system and irrigation water as a delivery system for the soluble matter, in particular a soluble fertilizer.

BACKGROUND OF THE INVENTION

Water is becoming a scarce resource in parts of the world and proper water management is becoming an important focus area in order to feed a growing world population. In addition, it is vital to apply plant nutrients and additives according to crop needs and it is well documented that the use of irrigation water as the delivery system for plant nutrients (fertigation) optimises the total crop performance (see for example U.S. Pat. No. 7,937,187, FW Enviro, LLC, May 2011). Among others, the benefits of fertigation include: 1) a uniform application in the form of uniform distribution and precision placement of input matter, such as fertilizers and crop supplements; 2) timely application wherein the input matter can typically be applied regardless of weather or field conditions; 3) reduced application costs such that the cost of application is about one-third the cost of conventional application methods; 4) improved crop management using timely applications of small but precisely delivered amounts of input matter directly to the root zone allows growers to effectively manage input matter programs, which conserves input matter, saves money, and optimizes yield and quality; 5) reduced soil compaction by reduced tractor and equipment traffic in fields; 6) minimizes exposure of workers to chemicals through reduced operator handling, mixing and dispensing of potentially hazardous matters with people and non-target crops not being exposed to inadvertent chemical drifts; 7) reduced environmental contamination when fertigation devices used are properly designed and calibrated including having the recommended safety devices to help preserve the quality of the environment; 8) marginal farming areas can be fertilized after the crops have emerged from the ground rather than adding input matter prior to crop emergence and wasting money on unused supplement.

A common fertigation system usually comprises a set of pressurized tubes to carry the water to the crops, drip and/or spray devices to dispense the water to the crops, a storage and dosage facility for the crop input matter (usually a fertilizer), the necessary pumps, valves and sensors and a central processing unit controlling the system.

The fertilizer can be added to the water on a continuous basis at concentrations and fertilizer ratios which are fit for the current grow stage of the crop. This is a common practice in intensive cropping systems where the fertilizer is applied at concentrations typically 0.1-0.05 weight % into the water, reaching the crops. However, care needs to be taken that the total amount of undissolved particulates is low, as a too high amount may clog and block the drip and/or spray devices and reduce the efficiency of the fertigation system.

In prior art fertigation systems, such as the one described in U.S. Pat. No. 7,937,187, in a first step, a concentrated liquid fertilizer solution or dry water soluble particles are first dissolved into a concentrated stock solution (typically 10-30%) which is subsequently diluted (typically at ratio 1:100) and, in a second step, injected into the pressurized water system by a pump or Venturi-type system to accommodate the right concentration for plant requirements. The prior art system is labour-intensive and demands repetitive work processes to dissolve and prepare the stock solution from the bulk particulate matter. As the bulk of the fertilizers are available in solid, particulate form, in the case of applying soluble input matter, it would be of interest to combine the dissolving and injection step in a combined dissolving and injector unit, and hence to directly use the dry particulate solids in the fertigation system without a step of dissolving said particulate solids, in particular fertilizers, first into a stock solution, usually done manually.

EP 1 749 443 discloses a sprayer having a remixing chamber (I, II) provided for remixing and for converting the granulated or powdered active component into liquid form. The remixing chamber is connected by a connection line (12) with container (1) for receiving the carrier fluid. The remixing chamber is connected with container (9) containing active component by another connection line (10, 18). Remixing chamber is connected with mixing chamber (5) by connection line (16, 17).

U.S. Pat. No. 6,173,732 discloses a chemical feeding system for adding either liquid or 100% water soluble solid chemicals including fertilizer, insecticide and a herbicide to a lawn sprinkler system either above or below ground level. The system has one or two vertically oriented mixing chambers containing a removable sponge filter. An effluent tube is attached to the bottom of the mixing chamber for recycling through an adjustable flow meter valve. A drain tube with a shutoff valve and a one-way check valve leads to the main sprinkler system.

US 2004/0042335 discloses an apparatus and method for introducing a dry material into a fluid stream in a way that ensures a predictable, highly accurate and consistent application of the material where the fluid stream may be fixed or variable, where the material is handled and metered in dry bulk form and may be highly soluble or nearly insoluble, and in a manner that continuously and automatically adjusts the application rate to compensate for varying material bulk density, as well as, and in addition to, varying fluid flow rates or chemical composition, in order to provide a precise fluid treatment level at all times. The present invention incorporates the necessary means to store large quantities of the dry process amendment as an integrated and dust-free function of the apparatus and process, and is capable of monitoring and adjusting material levels and introduction rates in real time in response to variations in density, fluid flow rate and/or chemistry composition.

EP 2 289 301 A1 (Melcart Projects, March 2011) describes a combined dissolution and injection system for solid particulate fertilizer, for use in the gardening/hobby sector, wherein the solid fertilizer is provided in an hermetically closed container, which is subsequently connected to the fertigation system by puncturing the bottom, filled with pressurized water from a bypass from an irrigation pipeline, and which injects its content through a Venturi-type injector into the irrigation pipeline at a constant pressure. Such system is not suitable for injection different amounts of fertilizer, different types of fertilizers or mixtures of different types of fertilizers and at varying rates. Furthermore, this device is operating only on the pressure side, such that it is necessary to pressurize the whole container up to the operating pressure of the irrigation pipeline.

US 2002/0186614 A1 (J. P. Millward, December 2002) describes a dissolution system for solid particulate fertilizer comprising a hopper which comprises an inverted perforated funnel the walls of which are sprayed on the inside with water such that particles of the feed present on the outside of said funnel are washed through the perforated funnel, forming a slurry in a slurry pan below the funnel, wherein the content of the pan is continuously pumped into an irrigation pipeline. Such system is very cumbersome to build and maintain.

There is a need for a fertigation system which utilizes particulate input matter as a feed, which is easy to operate in a continuous way, and which eliminates or at least reduces the amount of undissolved particles into the fertigation system.

SUMMARY OF THE INVENTION

The invention provides a device for supplying a particulate input matter through irrigation water according to any one of the appended claims.

In particular, the invention provides a device for supplying a particulate input matter through irrigation water, comprising at least one feed device, suitable for feeding particulate matter, and connected, by a first connection pipe, to the top of a vertically positioned slurry mixing chamber, located under the first connection pipe, and a pressurized mixing tank, connected to the bottom of the slurry mixing chamber by a second connection pipe, wherein, in one operation cycle:

(a) the feed device for the particulate input matter provides an amount of particulate input matter to the slurry mixing chamber at atmospheric pressure by gravity through the first connection pipe;

(b) the slurry mixing chamber is water-tightly closed off from the first connection;

(c) the bottom of the slurry mixing chamber is opened and the content thereof is allowed to fall into the second connection pipe by the action of gravity where it is exposed to the pressurized irrigation water and flushed out of the slurry mixing chamber with the pressurized irrigation water into the pressurized mixing tank;

(d) the slurry mixing chamber is closed off from the pressurized irrigation water supply and its content is drained; and (e) the slurry mixing chamber is opened again at its top for receiving a new amount of particulate fertilizer.

The particulate input matter should be in a solid state, water-soluble and free-flowing in particulate form, preferably provided as prills having a particle size of 4 mm or less.

In order to operate, the system is at least connected to a pressurized supply of water, in particular used for the fertigation/irrigation system to which it is connected.

Within the context of this application, with input matter is meant any matter, either chemical or biological, which meets the above criteria, and can be used in the field of fertigation, such as, but not limited to, fertilizers, plant nutrients, plant supplements, agro chemicals, herbicides, fungicides or other plant protection chemicals, or any mixture thereof.

The device is designed to dissolve and inject dissolved particulate input matter, optionally containing fine undissolved particles, in a predictable and consistent way into a pressurised irrigation system.

Within the context of this application, with "dissolved" is meant that the bulk (i.e. more than 90 weight %, preferably more than 95 weight %, more preferably more than 99 weight %) of the particulate matter is dissolved, preferably within 1 to 10 minutes, in water at ambient conditions, optionally containing some undissolved particles.

The particulate input matter can be supplied by a hopper, a conveyer belt, a silo, or the like, which allows storage of large quantities of the input matter, enabling to continuously feed the particulate input matter into the water through a slurry mixing chamber, operated by valves such that pressurized water will not come into contact with particulate input matter in the feed device. According to one embodiment, the feed device is a hopper. According to another embodiment, the system can be equipped with more than one feed device, such as more than one hopper, or more than one silo, In this way, large amounts can be put ready to use, or when using different input matters, stock solutions with different chemical formulations can be produced.

According to one embodiment, the opening and closing actions are performed by valves, preferably, ball valves, optionally powered by water or pressurized air. According to one embodiment, the necessary electricity for operating the valves and the automation unit can be provided by a main power line, or by solar panels, thus enhancing the independency of the device when deployed in remote locations.

The device is designed to work continuously repeating the same cycle over and over again, only limited by the availability of particulate matter. By using a sequential procedure of opening and closing of sections of the system by valves, (which may optionally be powered by the water or pressurized air), the particulate input matter will drop into the chamber by the action of gravity, and subsequently into the water on the pressurized side of the device where the particulate input matter is flushed with a bypass water-flow into the pressurized mixing tank, at least as a slurry, most probably as a mixture of a slurry and dissolved matter, as long as the water pressure in the bypass is higher than in the main irrigation pipe, which is obtained by the actuation of a pressure valve in the main irrigation line.

According to one embodiment, the diameters of the first connection pipe, slurry mixing chamber and second connection pipe have approximate the same internal diameter. It is obvious that the volume of the particulate matter that is transferred to the slurry mixing chamber, should be such that is maximally fills up the slurry chamber, but not more that the slurry mixing chamber can contain. Such volume may be controlled by the settings of the valve closing of the slurry mixing chamber, i.e. the time the valve is in the open position.

According to one embodiment, the functional valve opening of the inlet valve and the outlet valve have approximate the same diameter as the first connection pipe and second connection pipe, respectively. This allows an easy and swift transfer of the particulate matter from first connection pipe, to the slurry mixing chamber, and into the second connection pipe without material being left that could block the pipes or the chamber.

The slurry, comprising the dissolving particulate input matter, will be agitated by the inlet water and dissolved nearly up to completion, depending on the dissolution rate, amount of insolubles, temperature, etc., forming a concentrated stock solution. Once all soluble matter is dissolved, the larger particles of the insolubles will be retained at the bottom of the pressurized mixing tank. The dissolved input matter and the very fine insoluble particles of the input matter will remain in the solution and will exit the pressurized mixing tank at the top thereof. A filter can be installed before the concentrated stock solution is injected into the main irrigation pipe. Depending of the amount of insolubles in the particulate input matter, the pressurized mixing tank has to be cleaned on regular basis.

The dosing system can either be volumetric (unit of volume of concentrated stock solution injected per unit of time) or monitored through electrical conductivity (EC) of the irrigation water. For the latter, in order to keep the EC at the optimal level of the concentrated stock solution, an EC meter should be installed after the injection unit in the main line to monitor either:

a. the frequency of the opening/closing of the valves, regulating the speed of the dosing of the stock solution, or
b. regulate the valve on the main irrigation pipe in order to keep a constant level of EC by adding or reducing the water supply through the main irrigation pipe.

The system's functionality will depend on the ratio of the inlet bypass water to the amounts of input matter used, or stock solution injected. Input matter will differ in solubility but, as a reference, 5 to 30 times more water than input matter (such as fertilizer matter) should pass through the pressurized mixing tank. This should allow the input matter to dissolve and not accumulate as a heavy slurry in the pressurized mixing tank.

In a practical set up, the recommended ratio between the water from the main pipe to the concentrated solution from the pressurized mixing tank should be 100:1 to 10:1. The aim should be an input matter concentration which can vary between 0.05 to 1% in the final solution applied to the plant through the irrigation system.

The device according to the invention will require optimization of individual settings, depending of the dissolution speed of the fertilizer, which depends on the water temperature, the water throughput through the pressurized mixing tank and the characteristics of the fertilizer, such as physical shape (prill, granule) size and chemical nature of the input matters. However, this optimization is within the skills of the skilled person and need not to be disclosed at length herein.

BRIEF DESCRIPTION OF THE DRAWING

The invention will now be elucidated on the basis of one embodiment, as depicted in FIG. 1 and described hereafter. However, the invention will not be limited thereto but only by the scope of the claims as appended.

One embodiment for carrying out the invention is illustrated in the accompanying drawing in which FIG. 1 provides a perspective view of a layout of a device according to the invention. In this drawing, the numerals refer to the following parts:

1 Dry particulate matter dissolving and injection device
2 Hopper
3 First connection pipe
4 Inlet valve
5 Slurry mixing chamber
6 Drainage valve
7 Outlet valve
8 Second connection pipe
9 Bypass water conduit
10 Manometer
11 Main water inlet pipe (main fertigation pipe)
12 Pressurized mixing tank
13 Outlet pipe of the pressurized mixing tank
14 Self cleaning filter
15 EC meter
16 Valve

DETAILED DESCRIPTION OF THE ILLUSTRATED EMBODIMENT

Referring to FIG. 1, a dry particulate matter dissolving and injection device 1 is shown in accordance with the present invention, generally designed for introducing dry particulate matter into irrigation systems for fertigation applications.

The injection device 1 includes a main hopper 2, a vertical first connection pipe 3, an inlet hydraulic opening and closing valve 4, a vertical pipe, called the "slurry mixing chamber" 5, an hydraulic drainage valve 6, an outlet hydraulic opening and closing valve 7, a second vertical connection pipe 8, a bypass water conduit 9, provided with a manometer 10, a main water inlet pipe 11, a pressurized mixing tank 12, outlet pipe of the pressurized mixing tank 13, a self cleaning filter 14, an EC meter 15, an hydraulic valve steered by the EC 16, and a control panel with valves (not shown) powered by water pressure or air to regulate the opening/closing frequency of the valves 4, 6, and 7. Furthermore, the device may comprise a collection tank for the washout (slurry) from the slurry mixing chamber 5, a water level regulation device, and a Venturi-type valve or a pumping device to inject the washout back into the irrigation pipe, all of which are not shown in FIG. 1, but are well known by the skilled person.

The main principle is to feed in a continuous manner free flowing particulate input matter into a pressurized irrigation system for fertigation applications, preferably, but not limited to, fertilizer into the pressurized water. The dimensioning of the hopper, as well as of the complete system handling the dry particulate matter can be scaled to handle big-bags of 1200 kg or just hold a capacity of a single bag (25 kg) and can as such be adapted to be mounted to an EU-pallet. This makes the device mobile and versatile to deploy on the field, to be used for small-scale farming applications, such as on marginal farming areas.

From the hopper 2, which could have a lid as well as a closing device at the bottom (not drawn in the FIGURE) an amount of the particulate input matter feeds by gravity into the first connection pipe 3 before the inlet valve 4. The valve can be a hydraulic ball-valve, (dimensioned 2-4" adapted to the pipe dimension) which opens and a predetermined amount of free flowing input matter is then dropped into the slurry mixing chamber 5 at atmospheric pressure. The chamber may hold anything from 0.5 to 3 liter of input matter. After a few seconds, controlled by a programmed automation unit, the inlet valve 4 closes, such that the slurry mixing chamber 5 is water-tightly closed off from the first connection 3. During the next step in the sequence, the outlet valve 7 opens and the pressurized water flows into the slurry mixing chamber 5 while the fertilizer in the slurry mixing chamber 5 drops by the action of gravity into the second connection tube 8, and moves with the water into the pressurized mixing tank 12. Whereas the relative positions of the hopper, first connection tube and slurry mixing chamber should be such that the particulate matter is enabled to fall under the action of gravity, i.e. essentially vertical and on top of each other, the position of the second connection tube is such that it should carry the slurry to the pressurized mixing tank. Hence, such second connection tube can partly be horizontal, albeit it should contain a section where the particulate matter can enter said pipe under the action of gravity, such as an upright section, or a opening in the side of said second connection pipe. This steps functions as long as the pressure of the bypass water flow is higher than the water in the main pipe, which is regulated by the valve 16. This means that, according to an embodiment, valve 16 closes before valve 7 is opened, and valve 16 opens again after valve 7 is closed. To empty the fertilizer from the slurry mixing chamber may take a few seconds, then the outlet valve closes 7 the slurry mixing chamber 5 off from the pressurized irrigation water supply. The chamber now contains pressurized water containing some remaining dissolved particulate matter (wash-out). The amount of dissolved particulate matter in the wash-out is very low, but nevertheless, such amount should not be wasted and should be recycled.

The water pressure and the water slurry mixing chamber 5 have to be released and brought back to atmospheric pressure, prior to filling dry fertilizer into the slurry mixing chamber 5, hence the wash-out has to be drained from the chamber. Hence, at the bottom of the chamber there is a open/closing valve 6 to empty the wash-out from the slurry mixing chamber 5, preferably into a separate storage tank.

According to one embodiment, the device further comprises a storage tank to collect and hold the wash-out liquid, and preferably to inject it in the fertigation system. The storage tank may hold a volume of 50 to 100 liter, containing a float valve and a Venturi-type injector or a simple pump to transfer the collected wash-out back into the water, either at the inlet water side 11 or at the outlet water side. The storage tank, float valve and injection unit are not included in FIG. 1 since this technology is well known and easy to adapt.

After closing the valve 6, the next filling of supplement can start by opening the inlet valve again 4 such that the slurry mixing chamber 5 is opened again at its top for receiving a new amount of particulate fertilizer. The frequency of the cycle can be kept constant in time (one filling per 20 to 120 seconds) or alternatively it can be regulated as influenced by the EC value monitored in the final nutrient solution.

The slurry of the input matter which has moved into the pressurized mixing tank 12 at the bottom of the tank, will be agitated by the inlet water 11 and subsequently be dissolved. Coarse undissolved particles will be retained at the bottom in the pressurized mixing tank 12 and need to be removed after an irrigation campaign to avoid build up. The dissolved input matter, including fines (defined as having a diameter below 100 micron), will be part of the slurry/solution for injection, the fines are suspended in the solution and will move with the water to the outlet pipe on the top 13 of the pressurized mixing tank, depending on the velocity of the fluid inside the pressurized mixing tank. An estimated size of the pressurized mixing tank should be from 100 to 1000 liter. Before entering into the main water pipe, the slurry/solution could pass through a filter with a mesh, adapted to the type of irrigation equipment in use (sprinklers, pivots, mini-sprinklers or drip). When the water with the dissolved input matter is properly mixed with the water from the inlet water pipe, an EC meter in the main line should be installed to monitor and regulate the EC level in the nutrient solution. In this respect, the EC meter should give an on-line signal to the valve 16 prior to the injection of the slurry/solution in order to regulate the total water flow and hence the EC in the final solution.

The invention claimed is:

1. Device for supplying a particulate input matter through irrigation water, the device comprising:
   at least one feed device suitable for feeding particulate matter;
   a first vertical connection pipe;
   an inlet opening and closing valve;
   a vertically positioned slurry mixing chamber located under the first vertical connection pipe;
   a drainage valve connected to the mixing chamber;
   an outlet opening and closing valve;
   a second vertical connection pipe;
   a bypass water conduit;
   a main water inlet pipe;
   a pressurized mixing tank; and
   an outlet pipe;
   wherein
   the first vertical connection pipe is in one end connected to the feed device and in the other end to the vertically positioned slurry mixing chamber,
   the inlet opening and closing valve is located on the first vertical connection pipe,
   the second vertical connection pipe is in one end connected to the vertically positioned slurry mixing chamber and in the other end to the bypass water conduit,
   the outlet opening and closing valve is located on the second vertical connection pipe,
   the bypass water conduit is in one end connected to the main water inlet pipe and in the other end to the pressurised mixing tank, and
   the outlet pipe is in one end connected to the pressurised mixing tank and in the other end to the main water inlet pipe in a distance downstream of the connection between the main water inlet pipe and the bypass water conduit.

2. The device according to claim 1, further comprising one or more of the following:
   a manometer located on the main water inlet pipe,
   a self-cleaning filter,
   an electrical conductivity meter,
   a valve steered by the electrical conductivity meter, and
   a control panel with valves powered by water pressure or air to regulate the opening/closing frequency of the inlet opening and closing valve, the drainage valve, and the outlet opening and closing valve,
   and wherein
   the self-cleaning filter is located on the outlet pipe,
   the electrical conductivity meter is located on the main water inlet pipe downstream of the connection between the main water inlet pipe and the outlet pipe, and
   the valve steered by the electrical conductivity meter is located on the main water inlet pipe downstream of the connection between the main water inlet pipe and the bypass water conduit and upstream of the connection between the main water inlet pipe and the outlet pipe.

3. The device according to claim 1, wherein one or more of the valves is a ball valve powered by water or pressurized air.

4. The device according to claim 1, wherein the feed device is a hopper, a conveyor belt or a silo.

5. The device according to claim 1, wherein at least one feed device is a hopper, adapted to hold amounts between 25 and 1200 kg.

6. The device according to claim 1, wherein the particulate input matter is in a solid state, water-soluble and free-flowing in particulate form.

7. The device according to claim 1, wherein the input matter is selected from the group of fertilizers, plant nutrients, plant supplements, agro chemicals, herbicides, fungicides and other plant protection chemicals, or any mixture thereof.

8. The device according to claim 1, wherein the diameters of the first connection pipe, slurry mixing chamber and second connection pipe have approximately the same internal diameter.

9. The device according to claim 1, wherein the functional valve opening of the inlet valve and the outlet valve have approximately the same diameter as the first vertical connection pipe and second vertical connection pipe, respectively.

10. The device according to claim 1, further comprising a programmed automation unit for controlling the valves.

11. The device according to claim 1, further comprising a storage tank for collecting and holding the wash-out from the slurry mixing chamber.

12. The device according to claim 1, mounted on an EU-pallet.

13. A method for supplying a particulate input matter through irrigation water for fertigation applications, the method comprising:

applying a device comprising at least one feed device, suitable for feeding particulate matter, and connected, by a first vertical connection pipe, to the top of a vertically positioned slurry mixing chamber, located under the first vertical connection pipe, and a pressurized mixing tank, connected to the bottom of the slurry mixing chamber by a second vertical connection pipe, wherein, in one operation cycle:

(a) providing an amount of particulate input matter from the feed device to the slurry mixing chamber at atmospheric pressure by gravity through the first vertical connection pipe;

(b) closing off the slurry mixing chamber water-tightly from the first vertical connection pipe;

(c) opening the bottom of the slurry mixing chamber to allow the content thereof to fall into the second vertical connection pipe by the action of gravity where it is exposed to the pressurized irrigation water and flushed out of the slurry mixing chamber with the pressurized irrigation water into the pressurized mixing tank;

(d) closing off the slurry mixing chamber from the pressurized irrigation water supply and its content is drained; and (e) opening again the slurry mixing chamber at its top for receiving a new amount of particulate input matter.

* * * * *